United States Patent

Gagliardi et al.

[15] 3,661,632
[45] May 9, 1972

[54] PROCESS FOR BINDING PIGMENTS TO TEXTILES

[72] Inventors: Domenick D. Gagliardi, East Greenwich; Robert J. Cicione, Cranston, both of R.I.

[73] Assignee: Commercial Solvents Corporation, New York, N.Y.

[22] Filed: June 17, 1968

[21] Appl. No.: 737,284

[52] U.S. Cl.................117/143 A, 260/29.6 HN, 260/41 C
[51] Int. Cl.................................C08j 1/36, D06m 1/00
[58] Field of Search............260/88.3, 88.3 A, 29.6 HN, 260/307, 307.6, 41 C; 117/143 B, 143 A, 143 R

[56] References Cited

UNITED STATES PATENTS

| | | | |
|---|---|---|---|
| 3,248,397 | 4/1966 | Purcell | 260/307 |
| 3,367,895 | 2/1968 | Clark | 260/22 |
| 3,493,635 | 2/1970 | Davis et al. | 260/868 |
| 3,523,123 | 8/1970 | Wehrmerde | 260/307 |
| 3,458,527 | 7/1969 | Schramm et al. | 260/88.3 A |
| 3,488,294 | 1/1970 | Annand et al. | 260/88.3 |
| 3,508,960 | 4/1970 | Gagliardi et al. | 117/140 R |

OTHER PUBLICATIONS

"Textile Chemicals and Auxiliaries" by Speel et al. pp. 114–117, 232, 233, 244, 245, 420 and 421 Reinhold Pub. Co. New York (1957).

*Primary Examiner*—Jay H. Woo
*Attorney*—Howard E. Post and Robert H. Dewey

[57] ABSTRACT

A process for binding pigment to textiles, for example, cotton fabrics, by applying to the textile a liquid application medium having dispersed therein a pigment and a copolymer of an acrylic monomer of the formula

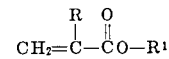

wherein R is hydrogen or methyl and $R^1$ is hydrogen or an alkyl radical having from 1 up to about 6 carbon atoms and an oxazoline of the formula

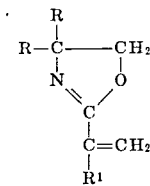

wherein R is a lower alkyl radical having from 1 to about 3 carbon atoms, a hydroxymethyl radical or the radical $-CH_2-OOC-R^1$ and $R^1$ is an alkyl radical having from 1 to about 25 carbon atoms, the weight ratio of acrylic monomer to oxazoline in said copolymer being in the range of from about 75:25 to about 95:5, and drying the textile.

5 Claims, No Drawings

PROCESS FOR BINDING PIGMENTS TO TEXTILES

BACKGROUND OF THE INVENTION

This invention relates to a process for treating textiles and to compositions for use in the process. In a particular aspect this invention relates to novel compositions for binding pigments to textiles comprising a pigment and a copolymer of an acrylic monomer of the formula

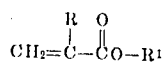

wherein R is hydrogen or methyl and $R^1$ is hydrogen or an alkyl radical having from 1 up to about 6 carbon atoms, hereinafter referred to as "acrylic monomer," and an oxazoline of the formula

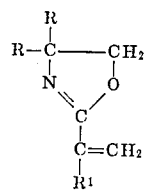

wherein R is a lower alkyl radical having from 1 to about 3 carbon atoms, a hydroxymethyl radical or the radical $-CH_2-OOC-R^1$, and $R^1$ is an alkyl radical having from 1 up to about 25 carbon atoms hereinafter referred to as "vinyl oxazoline," the weight ratio of acrylic monomer to vinyl oxazoline in the said copolymer being in the range of from about 75:25 to about 95:5, the said ingredients being dispersed in a liquid application medium. In a further aspect this invention relates to a process for binding pigments to textiles by application thereto of a liquid application medium comprising a pigment and a copolymer of acrylic monomer and vinyl oxazoline, the weight ratio of acrylic monomer to vinyl oxazoline in said copolymer being in the range of from about 75:25 to about 95:5, and drying the said textile.

An important attribute of textile materials, especially fabrics used for wearing apparel, is the ability to satisfactorily retain color under conditions of use, including laundering. Many textile materials, and in particular textiles dyed with pigments, do not adequately resist fading. The lack of colorfastness is commonly the result of imperfect fixation of the pigment on the textile. In turn this imperfect fixation is often caused by the low affinity of the pigment for the particular textile material.

Considerable work has been done in recent years in improving the binding of pigments to textiles and a variety of pigment binding agents have been made available for this purpose. Examples of such agents include ethyl acrylate, formaldehyde, urea formaldehyde, melamine resins, glyoxal and its derivatives. While ethyl acrylate in the general sense has been successfully employed in commercial operations as a pigment binder for cotton fabrics, it has not proven wholly satisfactory with all pigments and colors. In particular when red pigments are used, ethyl acrylate has not imparted satisfactory resistance to fading to cotton fabrics.

SUMMARY OF THE INVENTION

It is an object of this invention to provide novel compositions for binding pigments to textiles.

It is a further object of this invention to provide a process for binding pigments to textiles.

It is a still further object of this invention to provide a process for binding red pigments to textiles, particularly cotton fabrics, and thereby rendering the fabric resistant to fading.

Other objects and advantages of the present invention will be apparent from the specification and appended claims.

The process of the present invention comprises applying to a textile a liquid application medium having dispersed therein a pigment and a copolymer of acrylic monomer and vinyl oxazoline, the weight ratio of acrylic monomer to vinyl oxazoline in said copolymer being in the range of from about 75:25 to about 95:5, and drying the textile.

DETAILED DESCRIPTION

Copolymers of acrylic monomers and vinyl oxazoline are known to the art and may be prepared by any suitable polymerization procedure using vinyl oxazoline and acrylic monomers as starting materials. As indicated the weight ratio of acrylic monomer to vinyl oxazoline in the copolymers used in the present invention is in the range of from about 75:25 to about 95:5 and preferably in the range of from about 80:20 to about 90:10.

Examples of vinyl oxazolines used in the preparation of the copolymers include 2-isopropenyl-4-hydroxymethyl-4-ethyl-2oxazoline, 2-(1-hexadecylvinyl)-4,4-bis(stearoyloxymethyl)-2-oxazoline, 2-(1-eicosylvinyl)-4,4-bis(hydroxymethyl)-2-oxazoline, 2-isopropenyl-4,4-bis(hydroxymethyl)-2-oxazoline, 2-isopropenyl-4,4-bis(methyl)-2-oxazoline, 2-isopropenyl-4-propionyloxymethyl-4-ethyl-2-oxazoline, 2-isobutenyl-4-hydroxymethyl-4-ethyl-2-oxazoline, 2-(1-heptyl-vinyl)-4,4-bis(hydroxymethyl)-2-oxazoline etc. and the like. Vinyl oxazolines are known to the art and are prepared by the condensation of an oxazoline with formaldehyde. The starting oxazoline is also known to the art and is prepared by the condensation of an amino alcohol and an aliphatic monocarboxylic acid.

Examples of acrylic monomers include ethyl acrylate, methyl acrylate, methyl methacrylate, butylacrylate, acrylic acid, methacrylic acid etc. and the like with ethyl acrylate being preferred.

The amount of copolymer applied to the textile may vary over a wide range and will depend among other things on the amount of pigment, the particular pigment employed, and the particular fabric to be treated. Of course in all instances the amount of copolymer must be sufficient to bind the pigment to the textile. A weight ratio of copolymer to pigment of in the range of from about 10:1 to about 1:10 is typically employed.

Any suitable pigment used in pigment dyeing of textiles may be employed in the present invention and many such pigments are well known to the art. It is to be understood that the selection of pigment does not constitute a part of this invention and the invention is not limited to any particular pigment or group of pigments.

The compositions of the present invention can be applied from any suitable form of liquid application medium such as, for example, from an aqueous emulsion or a solution in a suitable organic solvent. Suitable application media can be prepared by dispersing the pigment and the copolymer in the liquid medium. When emulsions are to be formed, an emulsifying agent also should be included. Emulsifying agents are well known to this art and any such suitable agent can be employed. Examples of such suitable emulsifying agents include condensation products of octyl and nonylphenol with from 8 to 17 moles of ethylene oxide available under the names "-NIW" and "TERGITOL." Toward this end, when the copolymer of acrylic monomer and vinyl oxazoline is prepared by an aqueous emulsion polymerization procedure the aqueous emulsion polymerization product may be dispersed in the aqueous application medium without employment of additional emulsifier.

Although the fundamental ingredients of the compositions of the present invention are pigment and acrylic monomervinyl oxazoline copolymers, numerous other materials may be added to the application medium. The application medium may contain such additives as thermosetting agents, curing catalysts, softening agents, flameproofing agents, shrink-proofing agents, brightening agents, sizes, and the like. Materials in these groups are well known to those skilled in the art and would be applied to obtain the special effect indicated by the function of the agent. Alternatively, such materials can be applied to the textile material either before or after application of the pigment binding composition of the present invention.

The compositions of the present invention can be applied to textiles by any suitable procedure. Conventional impregnating, padding, and like treating apparatus can be employed. Usually it is convenient to apply the compositions of the present invention by dipping, padding, or immersing. Following application of the compositions of the present invention the textile is dried, as for example, by drying in air.

The invention will be understood more fully by reference to the following specific examples. It is understood that the examples are presented for purposes of illustration and are not intended as a limitation of the invention. In the following examples all parts are by weight.

EXAMPLE 1

A. A textile padding bath was prepared by mixing 12.5 parts of a 20 percent aqueous emulsion of a copolymer of ethyl acrylate and 2-isopropenyl-4-hydroxymethyl-4-ethyl-2-oxazoline and 3 parts of a red pigment sold under the name HILTASPERSE RED B in 84.5 parts of water. The copolymer was prepared by polymerizing 80 parts of ethyl acrylate with 20 parts of 2-isopropenyl-4-hydroxymethyl-4-ethyl-2-oxazoline in an aqueous emulsion polymerization medium. Pieces of cotton sateen cloth were padded with this bath and dried in air.

B. A second textile padding bath was prepared following the above procedure with the exception that the copolymer was prepared using 90 parts of ethyl acrylate and 10 parts of 2-isopropenyl-4-hydroxymethyl-4-ethyl-2-oxazoline. Pieces of cotton sateen cloth were padded and dried as in part A of this example.

C. A third textile padding bath was prepared by mixing 5 parts of a 50 percent aqueous emulsion of an ethyl acrylate polymer sold under the name HYCAR 4501 and 3 parts of the pigment used in parts A and B of this example in 92 parts of water. Pieces of cotton sateen cloth were padded and dried as above.

The fabrics obtained from parts A, B and C of this example were tested for fading according to the American Association of Textile Chemists and Colorists (AATCC) test method 16-A. Fading was effected by the Fade-Ometer. Samples of the fabrics were washed prior to testing, using washing procedure III of AATCC test method 61-A. Other samples were tested without prior washing. The results of the tests on the fabrics are given in Table I.

TABLE 1

| Sample | Fading of Fabric Initial | Washed |
|---|---|---|
| A | Very slight fading | Slight fading |
| B | Very slight fading | Slight fading |
| C | Slight fading | considerable fading |

The effectiveness of the compositions of the present invention as pigment binding agents is shown by the above test. It is apparent from the above test that better resistance to fading is obtained with the ethyl acrylate-vinyl oxazoline copolymers of the present invention than with an ethyl acrylate homopolymer pigment binding agent.

EXAMPLE 2

A textile padding bath was prepared by mixing 12.5 parts of a 20 percent aqueous emulsion of a copolymer of ethyl acrylate and 2-isopropenyl-4-hydroxymethyl-4-ethyl-2-oxazoline and 3 parts of a blue pigment sold under the name HILTASPERSE BLUE 2 G in 84.5 parts of water. The copolymer was prepared by polymerizing 80 parts of ethyl acrylate with 20 parts of 2-isopropenyl-4-hydroxymethyl-4-ethyl-2-oxazoline in an aqueous emulsion polymerization medium. Pieces of cotton sateen cloth were padded with this bath and dried in air. The fabric was tested for fading by the procedure referred to in Example 1 and the results are given in Table 2.

EXAMPLE 3

The procedure of Example 2 was repeated in all essential details with the exception that a green pigment sold under the name MULTISPERSE GREEN B was substituted for the blue pigment used in Example 2. The results are given in Table 2.

TABLE 2

| Example | Fading of Fabric Initial | Washed |
|---|---|---|
| 2 | Slight | Slight |
| 3 | Slight | Slight |

EXAMPLE 4

The procedure of Example 2 is followed in all essential details with the exception that 2-(1-hexylvinyl)-4,4-bis(hydroxymethyl)-2-oxazoline is substituted for 2-isopropenyl-4-hydroxymethyl-4-ethyl-2-oxazoline in the copolymer to bind pigment to the fabric.

EXAMPLE 5

The procedure of Example 2 is followed in all essential details with the exception that 2-(hexadecylvinyl)-4,4-bis(hydroxymethyl)-2-oxazoline is substituted for 2-isopropenyl-4-hydroxymethyl-4-ethyl-2-oxazoline in the copolymer to bind pigment to the fabric.

EXAMPLE 6

The procedure of Example 2 is followed in all essential details with the exception that methyl acrylate is substituted for ethyl acrylate in the copolymer to bind pigment to the fabric.

EXAMPLE 7

The procedure of Example 2 is followed in all essential details with the exception that acrylic acid is substituted for ethyl acrylate in the copolymer to bind pigment to the fabric.

EXAMPLE 8

The procedure of Example 2 is followed in all essential details with the exception that methyl methacrylate is substituted for ethyl acrylate in the copolymer to bind pigment to the fabric.

EXAMPLE 9

The procedure of Example 2 is followed in all essential details with the exception that methacrylic acid is substituted for ethyl acrylate in the copolymer to bind pigment to the fabric.

EXAMPLE 10

The procedure of Example 2 is followed in all essential details with the exception that butyl acrylate is substituted for ethyl acrylate in the copolymer to bind pigment to the fabric.

Since many embodiments may be made in this invention and since many changes may be made in the embodiments described, the foregoing is to be interpreted as illustrative only and the invention is defined by the claims appended hereto.

What is claimed is:

1. In a process for binding a pigment to textiles, whereby said textile is rendered resistant to fading, by applying thereto a liquid application medium comprising a pigment and a binding agent, the improvement comprising using as said binding agent a copolymer of an acrylic monomer of the formula

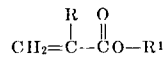

wherein R is hydrogen or methyl and R¹ is hydrogen or an alkyl radical having from 1 up to about 6 carbon atoms and an oxazoline of the formula

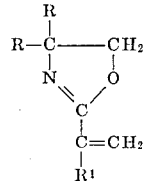

wherein R is a lower alkyl radical having from 1 to about 3 carbon atoms, hydroxymethyl or the radical $-CH_2-OOC-R^1$, and $R^1$ is an alkyl radical having from 1 up to about 25 carbon atoms, the weight ratio of acrylic monomer to oxazoline being in the range of from about 75:25 to about 95:5, and drying the textile.

2. The process of claim 1 wherein the weight ratio of acrylic monomer to oxazoline is in the range of from about 80:20 to about 90:10.

3. The process of claim 1 wherein the oxazoline is 2-isopropenyl-4-hydroxymethyl-4-ethyl-2-oxazoline.

4. The process of claim 1 wherein the acrylic monomer is ethyl acrylate.

5. The process of claim 1 wherein the textile is cotton fabric.

* * * * *